3,261,858
ALKENYL AND CYCLOALKENYL ESTERS OF
DITHIOCARBAZIC ACIDS
John J. D'Amico, Charleston, W. Va., assignor to
Monsanto Company, a corporation of Delaware
No Drawing. Filed July 25, 1962, Ser. No. 212,450
10 Claims. (Cl. 260—455)

This invention relates to new chemical compositions of matter. More particularly, this invention relates to esters of dithiocarbazic acids of the general formula

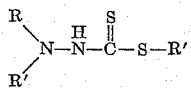

where R is hydrogen, lower alkyl or hydroxyalkyl, R' is hydrogen or lower alkyl and R'' is lower alkenyl, halogenated lower alkenyl or cyclohexenyl. Typical examples of R'' comprise cis- and trans-2,3-dichloro-2-butenyl, 3-chloro-2-butenyl, 2-chloroallyl, 2-bromoallyl, 3-chloroallyl, cis- and trans-2,3-dichloroallyl, 3-iodoallyl, 3-iodo-2-butenyl, 2,3-diodo-2-butenyl, 2-fluoro-3-chloroallyl, allyl, 2-butenyl, 4-chloro-2-butenyl, 3,3-dichloroallyl, 2-iodoallyl, 3-bromoallyl, 2,3-dibromoallyl and 2,3,3-trichloroallyl. When R'' is cyclohexenyl, the 2-cyclohexenyl radical is preferred but isomers thereof and middle halogen as well as lower alkyl substituted derivatives are contemplated. Examples are 3-cyclohexenyl, 4-bromo-2-cyclohexenyl, 2-chloro-2-cyclohexenyl, 3 - chloro - 2 - cyclohexenyl, 2 - bromo - 3 - cyclohexenyl, 2 - methyl - 2 - cyclohexenyl, 3-methyl - 2 - cyclohexenyl, 4 - methyl - 2 - cyclohexenyl, 5 - methyl - 2 - cyclohexenyl, and 2-ethyl-2-cyclohexenyl.

The componds are prepared most conveniently by condensing an alkali metal, ammonium or amine salt of the corresponding dithiocarbazic acid with a chloride or bromide containing the desired unsaturated ester radical. The lower alkenyl esters readily add halogen across the double bond and by successive halogenation and dehydrohalogenation the halogenated lower alkenyl esters can be prepared. However, it is generally more satisfactory to prepare the halogenated lower alkenyl chloride or bromide in a separate operation. The hydrogen on the nitrogen in the 2-position is somewhat basic and undergoes reaction with acidic condensing agents as for example, acetyl chloride and aldehydes, preferably formaldehyde. The thiocarbonyl radical under the influence of silver oxide is converted to the carbonyl radical. In the presence of oxygen catalyst the compounds undergo polymerization to form useful resins. A preferred class of resins are produced by condensing one mole of the carbazate with about one-half mole of formaldehyde and subjecting the resulting product to the action of oxygen catalysts including peroxides like benzoyl peroxide. The polymers vary from soluble fusible products to insoluble infusible resins depending upon the duration of the reaction.

Most of the compounds possess biological activity and find direct use in the industrial arts. It should be understood that all compounds of the aforesaid formula are by no means equivalent and the biological properties vary widely depending upon the substituent radicals R, R' and R''. Compounds in which R and R' are hydrogen and R'' is lower 2-alkenyl, mono- or dihalogenated lower 2-alkenyl or cyclohexenyl are contact herbicides some of which are also effective as pre-emergence herbicides. Allyl and 2,3-dichloroallyl esters of substituted dithiocarbazic acids where R and R' are lower alkyl or R' is hydrogen and R is 2-hydroxyethyl are pre-emergent grass herbicides. On the other hand, 2-chloroallyl esters of 3,3-di-lower alkyldithiocarbazic acids are useful foliage contact herbicides for control of broadleaf weeds. Other kinds of biological activity are hereinafter illustrated.

For the purpose of describing the invention and not as limitative thereof, the following examples are given:

*Example 1*

A solution comprising 33.8 grams (1.0 mole) of 95% hydrazine, 400 ml. of ethyl alcohol and 100 grams of concentrated ammonium hydroxide was prepared and 76 grams (1.0 mole) of carbon bisulfide added dropwise at 0–10° C. After stirring at 0–10° C. for 30 minutes, 76.6 grams (1.0 mole) of allyl chloride was added dropwise while maintaining the temperature at 0–10° C. The reaction mixture was stirred at 25–30° C. for 48 hours, then 400 ml. of water and 500 ml. of ethyl ether were added. The ether solution was separated, washed with water until neutral to litmus and dried over sodium sulfate. The ether was removed in vacuo at a maximum temperature of 80–90° C./1–2 mm. Allyl dithiocarbazate was obtained in 37% yield as an amber oil. Analysis gave 18.86% nitrogen compared to 18.90% calculated for $C_4H_8N_2S_2$.

*Example 2*

To a stirred solution containing 20 grams (0.53 mole) of 85% hydrazine, 85 grams (0.53 mole) of 25% sodium hydroxide and 300 ml. of water was added dropwise at 10–15° C., 40.4 grams (0.53 mole) of carbon bisulfide. External cooling was removed and the stirred reaction mixture held at 25–30° C. for an hour. Then 80.5 grams (0.5 mole) of 3-bromocyclohexene was added in one portion. The reaction mixture was stirred at 25–30° C. for 24 hours and then extracted with 500 ml. of ethyl ether. The ether solution was washed with water until neutral to litmus, dried over sodium sulfate and the ether removed in vacuo at a maximum temperature of 25–30° C. The 2-cyclohexenyl dithiocarbazate was obtained in 61.5% yield as a tan solid. It melted at 155–157° C. after recrystallization from ethyl alcohol. Analysis gave 14.83% nitrogen as compared to 14.87% calculated for $C_7H_{12}N_2S_2$.

*Example 3*

A solution comprising 30 grams (0.5 mole) of dimethyl hydrazine, 50 grams of concentrated ammonium hydroxide and 200 ml. of ethyl alcohol was prepared and 38 grams (0.5 mole) of carbon bisulfide added dropwise at 5–20° C. After stirring at 25–30° C. for one hour, 38.3 grams (0.5 mole) of allyl chloride was added in one portion. The reaction mixture was stirred at 25–30° C. for 24 hours and then 300 ml. of water and 400 ml. of ethyl ether added. The ether solution was washed with water until neutral to litmus, dried over sodium sulfate and the ether removed in vacuo. The product was dried on a porous plate. After recrystallization from heptane the allyl 3,3-dimethyldithiocarbazate melted at 67–68° C. It was obtained in 63.6% yield as a yellow solid analyzing 16.39% nitrogen and 36.28% sulfur compared to 15.89% nitrogen and 36.38% sulfur calculated for $C_6H_{12}N_2S_2$.

*Example 4*

To a stirred solution containing 30 grams (0.5 mole)

of dimethyl hydrazine, 50 grams of concentrated ammonium hydroxide and 200 ml. of ethyl alcohol was added dropwise at 5–15° C., 38 grams (0.5 mole) of carbon bisulfide and the mixture stirred at 25–30° C. for one hour. After cooling to 5° C., 62.5 grams (0.5 mole) of 1,3-dichloro-2-butene was added at 5–20° C. and stirring continued at 25–30° C. for 24 hours. Thereupon 350 ml. of water was added, the mixture cooled to 5° C., filtered, washed with cold water (500 ml.) and air-dried at 25–30° C. 3-chloro-2-butenyl 3,3-dimethyldithiocarbazate was obtained as a yellow solid in 76.7% yield. After recrystallization from heptane it melted at 83–84° C. Analysis gave 28.60% sulfur compared to 28.53% calculated for $C_7H_{13}ClN_2S_2$.

*Example 5*

To a stirred solution containing 38.2 grams (0.5 mole) of 2-hydroxyethyl hydrazine, 50 grams of concentrated ammonium hydroxide and 300 ml. of ethyl alcohol was added dropwise at 0–10° C., 38 grams (0.5 mole) of carbon bisulfide and the mixture stirred at 0–10° C. for 30 minutes. After cooling to 0° C. by means of an icebath, 38.3 grams (0.5 mole) of allyl chloride was added dropwise at 0–10° C. and the reaction mixture was stirred at 25–30° C. for 48 hours. Thereupon 400 ml. of water and 500 ml. of ethyl ether were added and stirring continued for 15 minutes. The ether solution was washed with water until neutral to litmus, dried over sodium sulfate and the ether removed in vacuo at a maximum temperature of 30° C./1–2 mm. Allyl 3-(2-hydroxyethyl)dithiocarbazate was obtained in 79.3% yield as an amber oil. It was insoluble in water and heptane but soluble in ether, acetone, benzene and ethanol. Analysis gave 14.50% nitrogen and 33.86% sulfur compared to 14.57% nitrogen and 33.35% sulfur calculated for $C_6H_{12}N_2OS_2$.

*Example 6*

To a stirred slurry of 6.7 grams (0.2 mole) of 95% hydrazine, 12.6 grams (0.2 mole) of concentrated ammonium hydroxide and 200 ml. of ethyl alcohol was added dropwise at 5–15° C., 15.2 grams (0.2 mole) of carbon bisulfide. After stirring the mixture at 25–30° C. for an hour, 36 grams (0.2 mole) of 1,1,2,3-tetrachloro-1-propene was added in one portion, causing the temperature to rise from 26 to 36° C. Stirring was continued at 25–30° C. for 24 hours whereupon 300 ml. of water and 300 ml. of ethyl ether were added and stirring continued for 25 minutes longer. The ether layer was washed with water until neutral to litmus and dried over sodium sulfate. The ether was removed in vacuo at a maximum temperature of 80–90° C./1–2 mm. 2,3,3-trichloroallyl dithiocarbazate was obtained in 57.7% yield as a dark amber oil. It was insoluble in water, slightly soluble in hot heptane but soluble in ether, acetone, benzene and ethanol.

*Example 7*

A solution comprising 17.7 grams (0.2 mole) of diethyl hydrazine, 20 grams of concentrated ammonium hydroxide and 100 ml. of ethyl alcohol was prepared and 15.2 grams (0.2 mole) of carbon bisulfide added dropwise at 5–15° C. After stirring at 25–30° C. for an hour, 36 grams (0.2 mole) of 1,1,2,3-tetrachloro-1-propene was added causing the temperature to rise from 25 to 55° C. The reaction mixture was stirred at 25–30° C. for 24 hours, 300 ml. of water added and the stirred reaction mixture cooled to 0° C. The resulting precipitate was collected by filtration, washed with water until neutral to litmus and air-dried at 25–30° C. 2,3,3-trichloroallyl 3,3-diethyldithiocarbazate was obtained in 84.5% yield as a tan solid melting at 79–80° C. after recrystallization from ethyl alcohol. Analysis gave 21.54% sulfur and 34.47% chlorine compared to 20.84% sulfur and 34.60% chlorine calculated for $C_8H_{13}Cl_3N_2S_2$.

The yield and physical properties of further examples of the invention made in a manner similar to that described in the preceding examples are recorded in the following table:

TABLE I

| Compound | Yield, percent | Physical Appearance |
| --- | --- | --- |
| 2-chloroallyl dithiocarbazate | 89.5 | Amber oil. |
| cis- and trans-2,3-dichloroallyl dithiocarbazate | 69.2 | Do. |
| 2-bromoallyl dithiocarbazate | 57.2 | Do. |
| 3,3-dichloroallyl dithiocarbazate | 52.5 | Do. |
| 3-chloroallyl dithiocarbazate | 72.4 | Amber, semi-solid. |
| 3-chloro-2-butenyl dithiocarbazate | 62.0 | Amber oil. |
| 3,3-dichloroallyl 3,3-dimethyldithiocarbazate | 88.0 | Do. |
| 2-chloroallyl 3,3-dimethyldithiocarbazate. | 83.6 | Do. |
| cis- and trans-2,3-dichloroallyl 3,3-dimethyldithiocarbazate. | 60.4 | Do. |
| cis- and trans-2,3-dichloroallyl 3-(2-hydroxyethyl)dithiocarbazate. | 73.6 | Do. |
| 2,3,3-trichloroallyl 3,3-dipropyldithiocarbazate. | 92.0 | Do. |
| Allyl 3,3-diethyldithiocarbazate | 88.2 | Do. |
| cis- and trans-2,3-dichloroallyl 3,3-diethyldithiocarbazate. | 82.0 | Do. |
| 3,3-dichloroallyl 3,3-diethyldithiocarbazate. | 69.5 | Do. |
| 2-chloroallyl 3,3-diethyldithiocarbazate | 64.9 | White solid, m.p. 75–77° C.ᵃ |
| 3-chloro-2-butenyl 3,3-diethyldithiocarbazate. | 75.0 | Amber oil. |
| 2-bromoallyl 3,3-diethyldithiocarbazate | 62.0 | Tan solid, m.p. 62–63° C.ᵇ |
| 3-chloroallyl 3,3-diethyldithiocarbazate | 35.6 | Tan solid, m.p. 84–85° C.ᵃ |

ᵃ = After recrystallization from heptane.
ᵇ = After recrystallization from ethyl alcohol.

As indicated, the new compounds possess biological activity. Some are effective for destroying undesired vegetation, the most important of which contain the $H_2N$—$NH$— radical, while others are useful for combatting plant diseases and microorganisms. As illustrative of herbicidal activity a spray containing various concentrations of the active ingredient shown in Table II was applied to the foliage of a mixture of grasses, to the foliage of bean plants and finally to the foliage of a mixture of broadleaved plants. The mixture is indicated in the table as "Broadleaf." A rating of 0 indicates no phytotoxicity, 1 slight, 2 moderate, 3 severe phytotoxicity, 4 plants dead and B defoliation.

TABLE II

| Active Ingredient | Percent Conc. | Phytotoxicity Rating | | |
| --- | --- | --- | --- | --- |
| | | Grass | Bean | Broadleaf |
| Allyl dithiocarbazate | 0.5 | 4 | 4 | 3+ |
| | 0.2 | 3 | 1+ | 4 |
| 2-chloroallyl dithiocarbazate | 0.5 | 3 | ¹3B | 1 |
| | 0.2 | 2 | 1+ | 2 |
| 3-chloroallyl dithiocarbazate | 0.5 | 1 | 1 | 2 |
| cis- and trans-2,3-dichloroallyl dithiocarbazate | 0.5 | 2 | 1 | 3+ |
| | 0.2 | 1 | 1 | 2 |
| 2-bromoallyl dithiocarbazate | 0.5 | 2 | ²2B | 2 |
| 3,3-dichloroallyl dithiocarbazate | 0.5 | 2 | 2 | 3 |
| 3-chloro-2-butenyl dithiocarbazate | 0.5 | 3 | 1 | 3 |
| | 0.2 | 2 | 0 | 3 |
| 2-cyclohexenyl dithiocarbazate | 0.5 | 1 | 1 | 3 |
| 2-chloroallyl 3,3-dimethyldithiocarbazate | 0.5 | 0 | 0 | 3 |
| 2-chloroallyl 3,3-diethyldithiocarbazate | 0.5 | 0 | | |

¹ 100% defoliation.
² 26–50% defoliation.

Table III illustrates pre-emergence herbicidal activity. The ester was emulsified in water and the emulsion applied as a spray. In this manner, the active ingredient at a dosage of 25 pounds per acre was applied to the ground of seeded plots before the grass or other plants emerged:

TABLE III

| Active Ingredient | Results Observed |
| --- | --- |
| Allyl dithiocarbazate | Severe phytotoxicity to rye grass and sugar beet; moderate phytotoxicity to brome grass and cotton. |
| 2-chloroallyl dithiocarbazate | Severe phytotoxicity to rye grass and buckwheat. |
| 2-bromoallyl dithiocarbazate | Severe phytotoxicity to foxtail, barnyard grass and crab grass; moderate phytotoxicity to rye grass accompanied by tillering or other formative effects. |
| 3,3-dichloroallyl dithiocarbazate | Moderate phytotoxicity to foxtail, barnyard grass, crab grass, pigweed and cotton. |
| 3-chloro-2-butenyl dithiocarbazate | Severe phytotoxicity to wild oats, brome grass, rye grass, foxtail, barnyard grass, crab grass and pigweed; moderate phytotoxicity to sugar beet. |
| 2-cyclohexenyl dithiocarbazate | Severe phytotoxicity to crab grass; moderate phytotoxicity to wild oats, brome grass, foxtail and barnyard grass. |
| cis- and trans-2,3-dichloroallyl 3-(2-hydroxyethyl)-dithiocarbazate | Severe phytotoxicity to crab grass. |
| cis- and trans-2,3-dichloroallyl 3,3-dimethyldithiocarbazate | Severe phytotoxicity to barnyard grass. |
| Allyl 3-(2-hydroxyethyl)-dithiocarbazate | Severe phytotoxicity to wild oats, wild buckwheat and tomato; moderate phytotoxicity to morning glory and sugar beet. |
| cis- and trans-2,3-dichloroallyl 3,3-diethyldithiocarbazate | Severe phytotoxicity to rye grass; moderate phytotoxicity to a mixture of grasses, foxtail and sorghum. |

Bacteriostatic activity was demonstrated against *Micrococcus pyogenes* var. *aureus* and *Salmonella typhosa*. Each of the test compounds were dissolved in a non-toxic solvent to give respective 1% stock solutions. The stock solutions were then added to nutrient agar in a quantity to give 1 part of product per 1,000 parts of agar. After thorough mixing, the agar was poured into Petri dishes and allowed to harden. One drop of a cell suspension of the bacteria served as inoculum for each plate. The inoculated plates were incubated for 2 days at a temperature of 37° C. At the end of that time inspection of the plates showed complete inhibition of growth of both the *M. pyogenes* var. *aureus* and *S. typhosa* employing the following test compounds:

2,3,3-trichloroallyl 3,3-diethyldithiocarbazate
2,3,3-trichloroallyl 3,3-dipropyldithiocarbazate
allyl 3,3-diethyldithiocarbazate
cis- and trans-2,3-dichloroallyl 3,3-diethyldithiocarbazate
2-chloroallyl 3,3-diethyldithiocarbazate
3-chloro-2-butenyl 3,3-diethyldithiocarbazate
2-bromoallyl 3,3-diethyldithiocarbazate
3-chloroallyl 3,3-diethyldithiocarbazate
cis- and trans-2,3-dichloroallyl 3-(2-hydroxyethyl)dithiocarbazate
3,3-dichloroallyl 3,3-diethyldithiocarbazate
cis- and trans-2,3-dichloroallyl dithiocarbazate.

Fungistatic activity was demonstrated against *Aspergillus niger*. In this test, the test chemicals were mixed in predetermined concentrations with hot dextrose agar which was subsequently poured into Petri dishes, cooled and allowed to harden. The nutrient agar containing the test compound was then inoculated with the fungus organism and the samples incubated for 5 days at 25° C. Growth of the fungus was suppressed by the following compounds at a concentration of 1 part of the dithiocarbazate per 10,000 parts of the agar:

cis- and trans - 2,3 - dichloroallyl 3,3 - dimethyldithiocarbazate
3,3-dichloroallyl 3,3-dimethyldithiocarbazate
cis- and trans-2,3-dichloroallyl 3-(2-hydroxyethyl)dithiocarbazate.

Complete inhibition of the growth of this test fungus using one part of dithiocarbazate per 100,000 parts of agar was obtained with cis- and trans-2,3-dichloroallyl dithiocarbazate.

2,3,3-trichloroallyl dithiocarbazate was quite effective as a fungicide. For example, an aqueous suspension containing 0.03% of this compound and a wetting agent was effective in suppressing disease of tomato leaves inoculated with early blight (*Alternaria solani*). Emulsions containing 0.01% of cis- and trans-2,3-dichloroallyl 3,3-diethyldithiocarbazate, 2-bromoallyl 3,3-diethyldithiocarbazate and 3-chloroallyl 3,3-diethyldithiocarbazate applied to tomato plants were effective in preventing tomato late blight (*Phytophthora infestans*). At a concentration of 1250 parts per million on cucumber plants 3-chloro-2-butenyl 3,3-dimethyldithiocarbazate controlled *Colletotrichum lagenarium*, the causative agent of cucumber anthracnose. Fair control of the same organism on cucumber plants was observed with 312 parts per million of cis- and trans-2,3-dichloroallyl 3-(2-hydroxyethyl)dithiocarbazate.

Allyl dithiocarbazate, cis- and trans-2,3-dichloroallyl dithiocarbazate and 3,3-dichloroallyl dithiocarbazate were effective as wheat rust eradicants at a concentration of 0.1%. In a few instances insecticidal properties were observed. At a concentration of 0.001% of the active ingredient, 100% kill of the yellow fever mosquito larvae was noted with 3-chloroallyl dithiocarbazate, 2-bromoallyl dithiocarbazate, 3,3-dichloroallyl dithiocarbazate and 3,3-dichloroallyl dimethyldithiocarbazate.

It is intended to cover all changes and modifications of the examples of the invention herein chosen for purposes of disclosure which do not constitute departures from the spirit and scope of the invention.

What is claimed is:
1. An ester of a dithiocarbazic acid of the formula

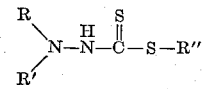

wherein R is selected from the group consisting of hydrogen, lower alkyl and hydroxyloweralkyl, R' is selected from the group consisting of hydrogen and lower alkyl and R'' is selected from a group consisting of lower alkenyl, halogenated lower alkenyl and cyclohexenyl.

2. An ester of a dithiocarbazic acid of the formula

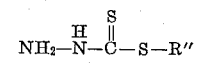

where R'' is lower 2-alkenyl.

3. An ester of a dithiocarbazic acid of the formula

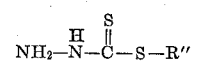

where R'' is chloro lower 2-alkenyl containing 1–3 chlorine atoms inclusive attached to unsaturated carbon.

4. An ester of a dithiocarbazic acid of the formula

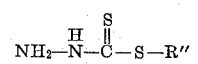

where R'' is cyclohexenyl.
5. Allyl dithiocarbazate.
6. 2-cyclohexenyl dithiocarbazate.
7. 2-chloroallyl dithiocarbazate.
8. Cis- and trans-2,3-dichloroallyl dithiocarbazate.
9. 2,3,3-trichloroallyl dithiocarbazate.
10. Cis- and trans-2,3-dichloroallyl 3,3-diethyldithiocarbazate.

(References on following page)

References Cited by the Examiner

UNITED STATES PATENTS

| | | | |
|---|---|---|---|
| 2,642,451 | 6/1953 | Weijlard et al. | 260—455 |
| 2,673,159 | 3/1954 | Beaver | 260—455 XR |
| 2,674,614 | 4/1954 | Wangel | 260—455 |
| 2,785,101 | 3/1957 | Urbschat et al. | 167—30 |
| 2,977,209 | 3/1961 | Tilles et al. | 71—2.3 |
| 2,989,393 | 6/1961 | Tilles et al. | 71—2.3 |

CHARLES B. PARKER, *Primary Examiner.*

DANIEL D. HORWITZ, *Examiner.*

D. R. MAHANAND, *Assistant Examiner.*